Figure 1:
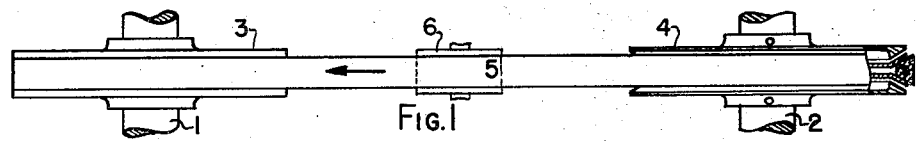

Sept. 2, 1941.    L. J. BERKELEY    2,254,592
BELT CLUTCH
Filed March 19, 1938    3 Sheets-Sheet 1

INVENTOR
Laurence J Berkeley

Sept. 2, 1941.　　　L. J. BERKELEY　　　2,254,592
BELT CLUTCH
Filed March 19, 1938　　　3 Sheets-Sheet 2

INVENTOR
Laurence J. Berkeley

Sept. 2, 1941.　　　　L. J. BERKELEY　　　　2,254,592
BELT CLUTCH
Filed March 19, 1938　　　　3 Sheets-Sheet 3

INVENTOR
Laurence J Berkeley

Patented Sept. 2, 1941

2,254,592

UNITED STATES PATENT OFFICE 2,254,592

BELT CLUTCH

Laurence J. Berkeley, Cleveland, Ohio

Application March 19, 1938, Serial No. 196,854

2 Claims. (Cl. 74—216.5)

Driving belts are mounted on spaced pulleys or sheaves, one of which drives the other through the belt. The present invention relates to situations in which one of the belt carrying pulleys is loose upon its shaft and therefore must be clutched to the shaft when power is to be transmitted. Further, the invention has special reference to so-called V-belt drives, in which the problem of joining the idle pulley to its shaft is aggravated.

Ordinary clutches are positioned between pulley and shaft and occupy too much space on the shaft; and are particularly objectionable where a number of belts and pulleys must be used side by side, as in multiple belt drives and in belt driven variable speed drives.

The objects of the invention are to avoid former difficulties and limitations and to provide better and less costly belt clutches.

To such ends, the present invention comprises a belt clutch, ordinarily combined with the driving pulley and having pulley parts which are fixed upon that shaft, together with a companion pulley part which is loose upon that shaft and idly carries the belt, leaving the fixed clutch parts free until a force is exerted to set the belt into operation thereon.

In particular, the invention includes means whereby such extraneous force may be imposed directly upon the belt and overcome the idling power of the idle pulley part thereby allowing the moving belt to engage directly or indirectly with the fixed pulley parts.

The invention also comprehends numerous forms of the fundamental appliance above defined, offering numerous conveniences, possibilities and advantages which will be detailed hereinafter.

The complete invention and some of the forms in which it may be constructed are all clearly illustrated in the drawings that form parts of this specification.

Figure 2:
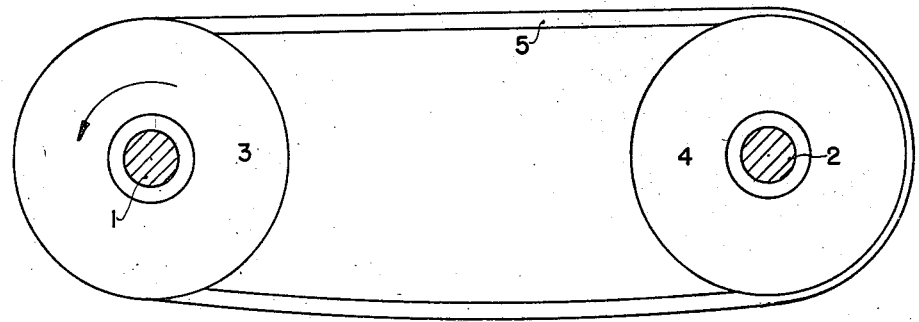
Figure 3:
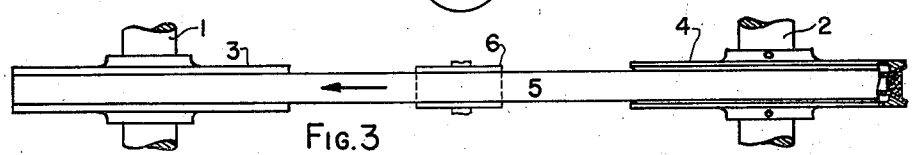
Figure 4:
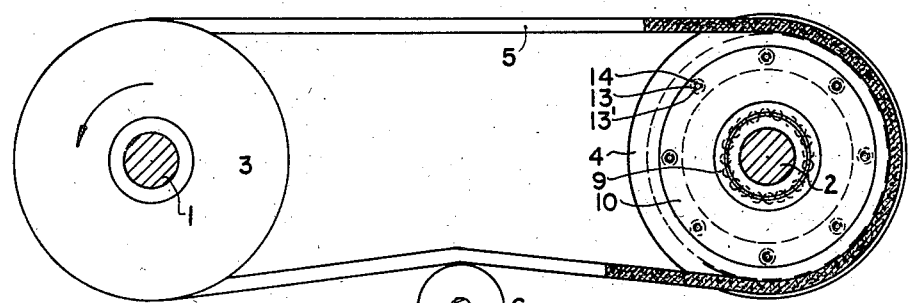
Figure 5:
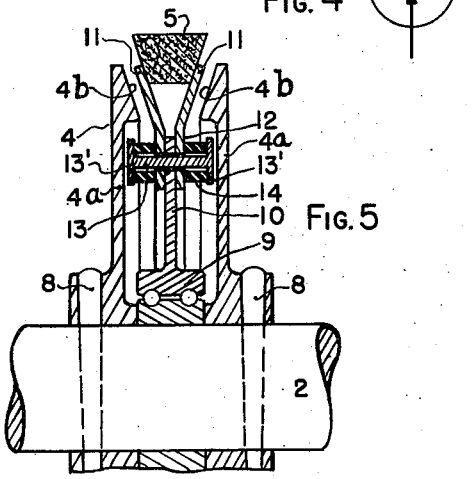
Figure 6:
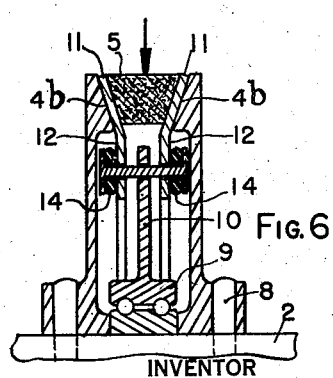
Figure 7:
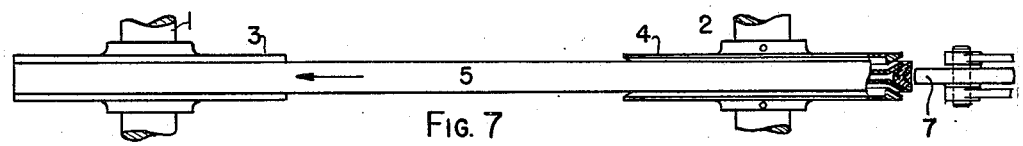
Figure 8:
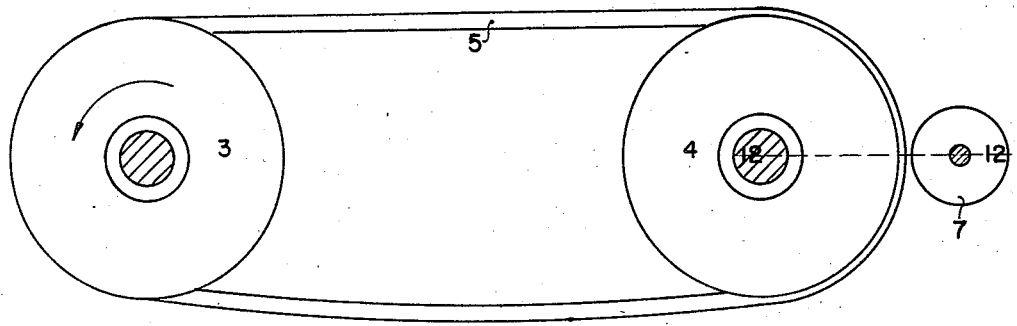
Figure 9:
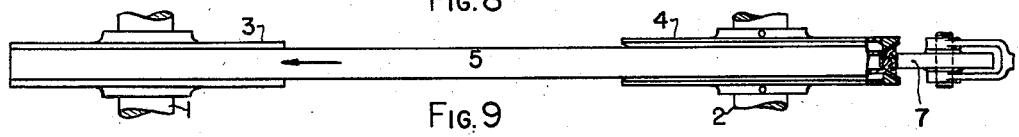
Figure 10:
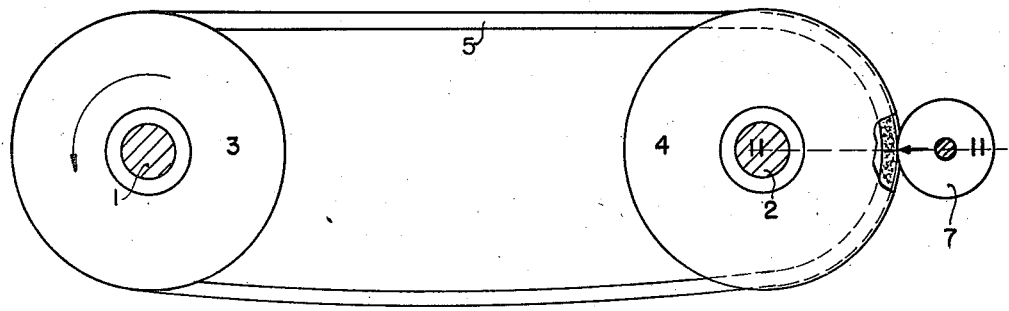
Figure 11:
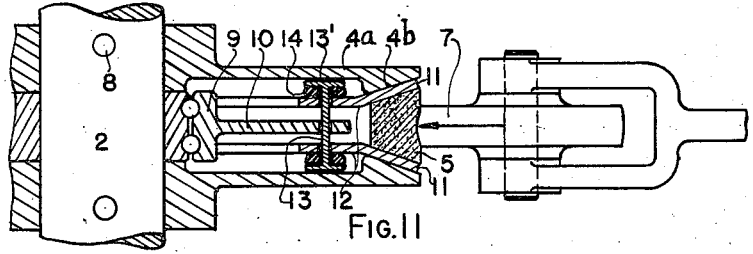
Figure 12:
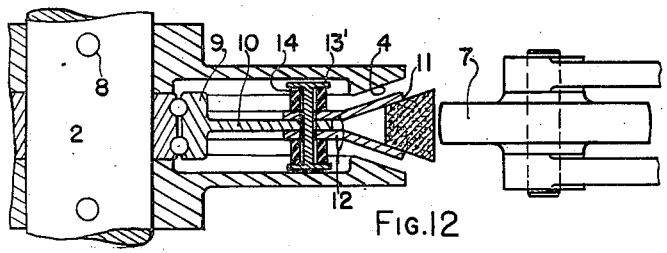
Figure 13:
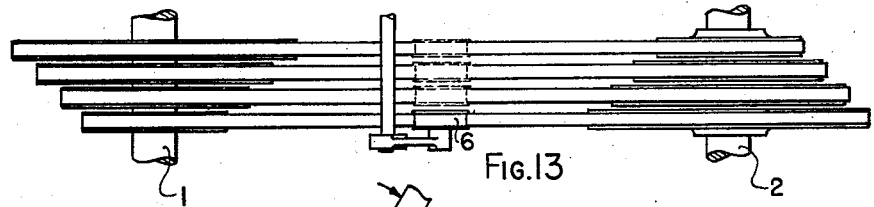
Figure 14:
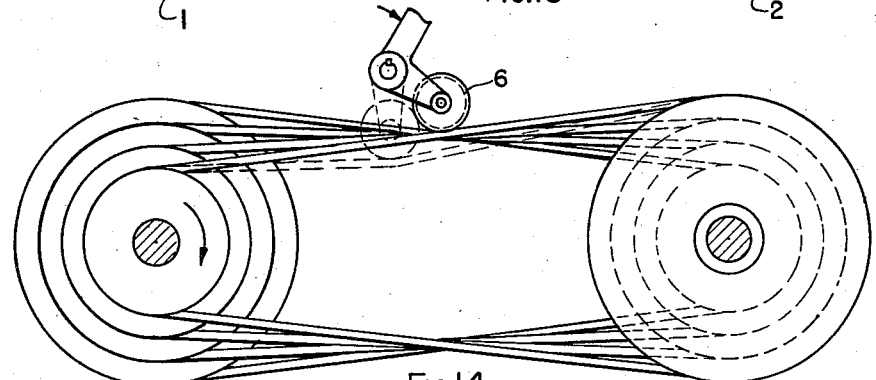
Figure 15:
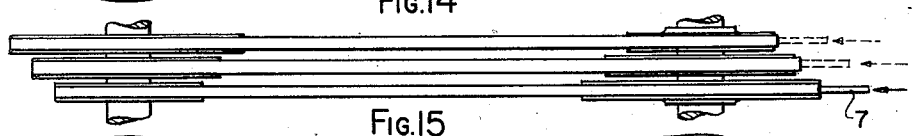
Figure 16:
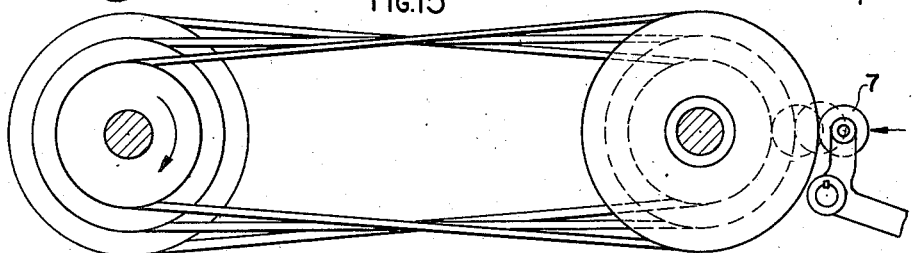
Figure 17:
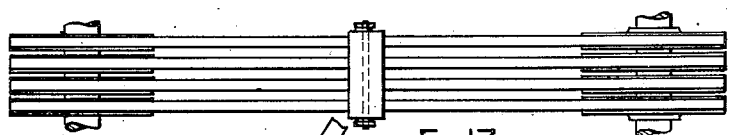
Figure 18:
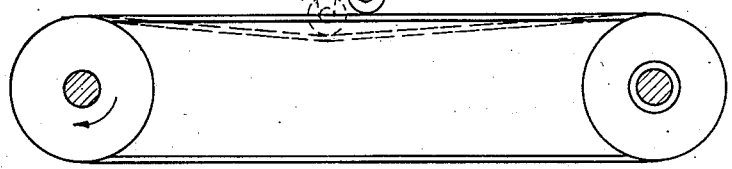

In said drawings Fig. 1 is a plan view of spaced shafts and pulleys and a V-belt mounted thereon, the parts being shown in unclutched or free running condition; Fig. 2 is an end elevation taken from Fig. 1; Fig. 3 is a plan view showing the parts in clutched condition; Fig. 4 is an end view taken from Fig. 3; Fig. 5 is an enlarged sectional view of the clutch pulley mechanism in unclutched condition corresponding to Figs. 1 and 2; Fig. 6 is an identical sectional view showing the parts in clutched condition: The clutch arrangement shown in Figs. 1 to 6 is actuated by an extraneous force imparted through an idler belt tightener whereby the belt may be tightened to force the belt clutch into action; Fig. 7 is a plan view resembling Fig. 1, but showing means whereby the extraneous force is applied directly toward the driven pulley and against the belt as it moves about that pulley; Fig. 8 is an end view taken from Fig. 7; Fig. 9 is a plan view like unto Fig. 3 and also showing the belt of Fig. 7 in clutched condition; Fig. 10 is an end view taken from Fig. 9; Fig. 11 is an enlarged sectional detail substantially on the line 11—11 of Fig. 10; Fig. 12 is a like sectional view on the line 12—12 of Fig. 8; Fig. 13 is a plan view illustrating the application of the invention to and as a variable speed belt drive; Fig. 14 is an end view taken from Fig. 13; Fig. 15 is a variable speed drive which follows the plan of Figs. 7 to 12; Fig. 16 is an end view taken from Fig. 15; Fig. 17 is a plan view of a multiple belt drive embodying this invention and following the plan of Figs. 1 to 6; Fig. 18 is an end view taken from Fig. 17: It will be understood that multiple belt drives may likewise follow the plan of Figs. 7 to 12.

Except for the showings, Figs. 13 to 18 which are typical, no attempt has been made to show the many special applications of the invention. Instead, the purpose hereof is to make clear the principle of the invention and enough forms thereof to enable others to design various useful applications in and to machinery of all sorts embodying belt drives, particularly those which embody V-belt drives, which are generally preferred because of positive action and the saving of shaft space which is characteristic thereof.

In the drawings 1 and 2 represent parallel spaced shafts; 3 and 4 represent belt pulleys mounted thereon, and 5 represents the belt mounted or running upon the pulleys 3 and 4.

For convenience of description it is presumed that the pulley 3 is fixed upon the shaft 1 and that that shaft is driven, transmitting its force through the belt; whereas the shaft 2 and the pulley 4 are only driven when the belt is clutched thereon as about to be described.

Most conveniently Figs. 1 to 6 and Figs. 7 to 12 should be read together, for the structures there shown are identical except in the means whereby external or extraneous force is applied to accomplish the clutching of the driven belt to the shaft 2. Such extraneous force is applied directly to the belt, either by a movable belt tightening idler 6 as shown in Figs. 1 to 4 or by an idler pulley 7, movable toward and from the clutch pulley 4, as shown in Figs. 7 to 12 inclusive.

The driving pulley 3 is of simple, common form, having a periphery suited to the belt which is to be used upon it; generally, a so-called V-belt. The clutch pulley 4 is of a complex form (presented in differing designs) requiring special explanation.

The construction of the pulley 4 in the best form thus far devised will be understood from Figs. 5 and 6 and Figs. 11 and 12. The body of the pulley comprises the spaced pulley elements 4a, mounted upon the shaft 2 and fixed thereon as by tapered pins 8 or by keys. The space between the two parts 4a is occupied by a loose or idle pulley best comprising a ball bearing 9 rotatable upon the shaft 2.

The part 9, whatever its size, has a flange or fin 10 and that flange bears with it two reversely beveled clutch parts 11, presenting web portions 12. The parts 11 correspond in pitch to the clutch faces 4b of the parts 4a and when spread apart engage those faces. The web portions 12 are loosely united to the flange 10 by a plurality of spring cross pins 13. Between the heads 13' of each pin, 13, and the parts 12 are compression springs 14, which preferably take the form of stiff rubber rings.

When free, the parts 12 close against the part 10 but when distended or expanded the parts are separated as shown in Fig. 6.

The V-belt 5 runs upon the inner faces of the parts 11, and is normally distended thereby; not that the belt is stretched or lengthened but that it is held out of work to such an extent that the parts 11 are not forced apart, into engagement with the clutch faces 4b. As will be apparent, the V-belt is here employed after the manner of a wedge by which the parts 11 may be separated and driven into engagement with said faces 4b.

Next it is to be noted that the idly running clutch parts 11 which carry the belt can be pushed apart either by exerting longitudinal stress on the belt 5, as shown in Figs. 1 to 5, or by direct pressure against the belt, as shown in Figs. 7 to 12.

When the belt is thus pulled or pushed inward toward the shaft 2, the clutch parts 11 which normally run idly on the bearing 9 are driven firmly into engagement with the clutch faces 4b which are fixed upon the shaft 2 and thereafter all parts rotate together; but only just so long as inward stress is exerted upon the belt.

Following the principle above explained, it becomes possible to assemble pairs of pulleys as indicated in Figs. 3 and 17 and in various other manners, each belt being provided with a self-contained clutch pulley embodying this invention.

For variable speed arrangements the idlers 6 and 7 are arranged to move sidewise, from one to the other of the clutch pulleys.

All belts may be allowed to run idly, or by this means any one belt may be clutched to the shaft 2.

Further descriptions appear to be unnecessary, for those who are skilled in the art, having gained an understanding of the principle hereof, will be able to design belt drives of any desired kind and for any duty.

Having thus described my invention, I claim as new and desire to secure by Letters Patent.

1. A belt actuated clutch pulley comprising a revoluble shaft, a plurality of spaced belt pulleys fixedly attached to said shaft, a freely rotatable bearing member mounted on said shaft between said spaced belt pulleys, a plurality of spaced belt clutch elements carried by said rotatable bearing member, a plurality of resilient elements positioned between said spaced belt pulleys and said belt clutch elements adapted to force said belt clutch elements inwardly with respect to each other and means adapted to support said resilient elements.

2. A belt actuated clutch pulley comprising a revoluble shaft, a plurality of spaced belt pulleys fixedly attached to said shaft and adapted to receive a V-shaped belt, a freely rotatable bearing member mounted on said shaft between said spaced belt pulleys, a plurality of spaced belt clutch elements carried by said rotatable bearing member, a plurality of resilient elements positioned between said spaced belt pulleys and said belt clutch elements adapted to force said belt clutch elements inwardly with respect to each other and means adapted to support said resilient elements.

LAURENCE J. BERKELEY.